United States Patent [19]

Rosaen

[11] 4,388,835
[45] Jun. 21, 1983

[54] FLUID FLOW METER

[75] Inventor: Nils O. Rosaen, Clarkston, Mich.

[73] Assignee: Universal Flow Monitors, Hazel Park, Mich.

[21] Appl. No.: 289,290

[22] Filed: Aug. 3, 1981

Related U.S. Application Data

[63] Continuation-in-part of Ser. No. 67,444, Aug. 20, 1979, Pat. No. 4,282,761.

[51] Int. Cl.$^3$ .............................................. G01F 1/22
[52] U.S. Cl. ................................................ 73/861.58
[58] Field of Search ............ 73/861.53, 861.54, 861.58

[56] References Cited

U.S. PATENT DOCUMENTS

| | | | |
|---|---|---|---|
| 2,654,245 | 10/1958 | Hill | 73/861.58 |
| 3,234,790 | 2/1966 | Ekstrom | 73/861.58 |
| 3,554,031 | 1/1971 | Turner | 73/861.58 |
| 3,889,535 | 6/1975 | Bull et al. | 73/861.54 |
| 4,064,751 | 12/1977 | Deisenroth | 73/861.53 |

Primary Examiner—Herbert Goldstein
Attorney, Agent, or Firm—Gifford, VanOphem, Sheridan & Sprinkle

[57] ABSTRACT

A fluid flow meter comprising a housing having a fluid inlet, a fluid outlet and defining an internal fluid chamber. A fluid passageway is formed in the housing for connecting the inlet with one end of the chamber while the outlet is open to the other end of the fluid chamber. The ends of the chamber are closed at the outlet end by an end cap and the other inlet end by a cartridge assembly which includes an end cap. Central to the housing fluid passageway and to the inlet end cap is attached to a rod having a conical metering portion. Attached to the metering rod is a freely centering piston assembly sealed nearest the outlet end by a flexible seal. An axial bore is formed through the piston and an orifice plate is detachably secured to the piston at near midpoint in the axial bore. One side of the plate is open to the inlet end while the other side of the plate is open to the outlet end of the chamber.

15 Claims, 5 Drawing Figures

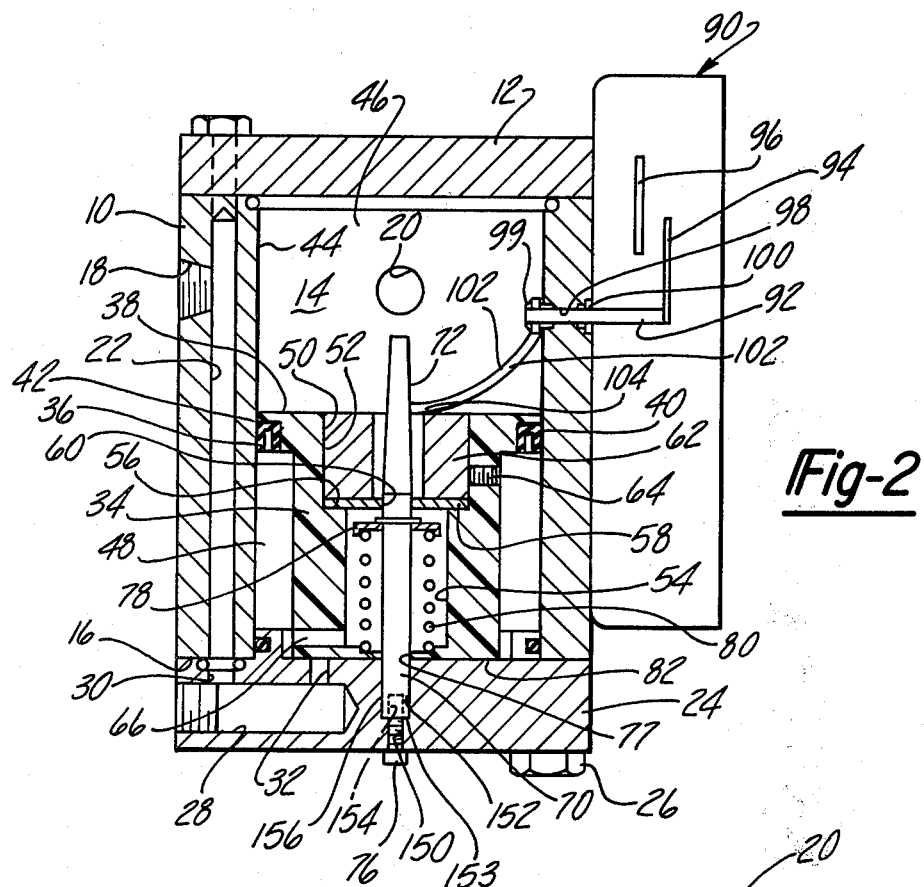
Fig-2
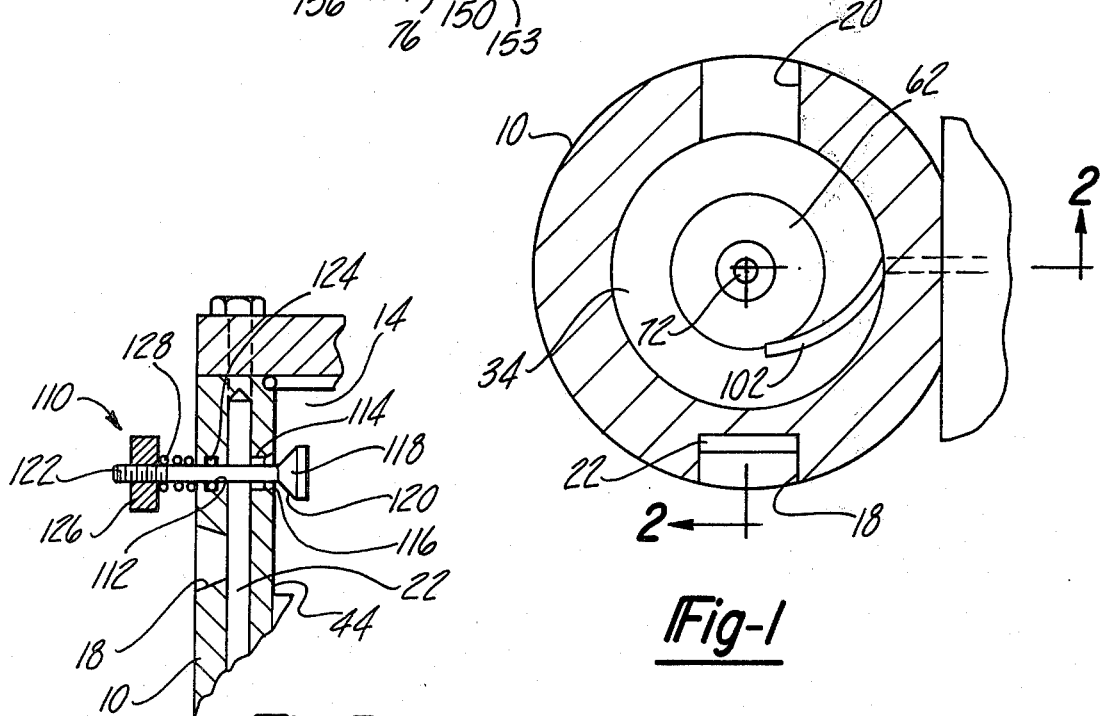
Fig-3
Fig-1

FLUID FLOW METER

CROSS REFERENCE

This is a continuation-in-part of my copending U.S. patent application Ser. No. 67,444 filed Aug. 20, 1979, now U.S. Pat. No. 4,282,761 issued Aug. 11, 1981 and entitled FLUID FLOW METER. That application is hereby incorporated by reference and made a part hereof.

BACKGROUND OF THE INVENTION

I. Field of the Invention

The present invention relates generally to fluid flow meters and, more particularly, to a fluid flow meter in which the fluid flow range for the flow meter can be easily varied.

II. Description of the Prior Art

There have been a number of previously known fluid flow meters having a housing with a fluid inlet, a fluid outlet and means for measuring and visually indicating the fluid flow rate through the flow meter. For example, in one type of previously known fluid flow meter, a semicircular vane cooperates with a hemispherical shaped housing disposed between the fluid inlet and the fluid outlet. Rotation of the vane provides a variable size opening between the vane edge and the housing while resilient means urge the vane toward a closed position. An indicator assembly measures the rotation of the vane caused by the fluid flow through the housing to provide an exteriorly visible signal of the fluid flow rate through the housing.

In a still further type of fluid flow meter, a tapered needle cooperates with a port which fluidly connects the inlet to the outlet. In addition, a piston is axially slidably mounted within the housing so that the displacement of the piston caused by the fluid flow through the flow meter variably opens the port in dependence upon the flow rate. Electrical and/or mechanical indicating means are attached to the piston to provide a signal of the axial displacement or position of the piston and, hence, of the flow rate through the flow meter.

One disadvantage of these previously known flow meters is that the flow range for the flow meter is preset and nonadjustable after assembly of the flow meter. Consequently, if a different range for the flow meter is desired, it is necessary to replace the entire flow meter.

A still further disadvantage of the previously known flow meters with movable pistons is that the pistons tend to cock during travel which produces inaccurate flow meter readings. Large seals can be provided on opposite ends of the piston to minimize cocking but large seals increase the friction or drag between the piston and the housing and also adversely effect the accuracy and reliability of the flow meter.

SUMMARY OF THE PRESENT INVENTION

The present invention overcomes the above mentioned disadvantages of these previously known flow meters by providing a flow meter in which the flow range for the flow meter can be simply and rapidly changed in the field. Moreover, as will become hereinafter apparent, the flow meter of the present invention is of simple and yet durable and rugged construction and only a single seal is provided between the piston and the housing.

In brief, the flow meter according to the present invention comprises a generally cylindrical housing having a fluid inlet, a fluid outlet and fluid passage means for fluidly connecting the inlet to the outlet. The fluid passage means includes an elongated and generally cylindrical chamber formed in the housing which is open at one end. The fluid inlet is fluidly connected to one end of the housing chamber while the fluid outlet is open to the other end of the housing chamber.

A cylindrical piston having an enlarged diameter rim at one end is axially slidably disposed within the housing chamber. A seal is mounted in a circumferential groove around the piston rim which sealingly engages the walls of the housing chamber thus dividing the housing chamber into upper and lower subchambers. The upper subchamber is open to the fluid outlet while the lower subchamber is open to the fluid inlet.

An axial throughbore is formed through the piston and has an enlarged diameter portion at one end and a reduced diameter portion at its other end thus forming an annular abutment surface therebetween. In one form of the invention, a plate having a central orifice is removably positioned within the enlarged diameter portion of the piston assembly bore so that the plate abuts against the abutment surface while an annular retainer is detachably secured within the enlarged diameter portion of the piston bore to hold the orifice plate in position. One side of the orifice plate is open to the upper subchamber, and thus to the fluid outlet while the other side of the orifice plate is open to the lower subchamber through radial bores formed in the piston. In a second embodiment of the invention, the orifice plate is fixedly secured to the piston.

The flow meter of the present invention further comprises a cylindrical cap which is detachably secured across and closes the open end of the housing chamber. An elongated metering rod having a tapered portion is detachably secured to the cap so that the rod tapered portion extends through the orifice plate while a compression ring disposed between the rod and the piston urges the piston toward the cap and thus towards the inlet end of the housing chamber. The metering rod together with the piston forms a cartridge which can be easily detached from the cap.

In operation, the area of the opening between the orifice in the orifice plate and the metering rod increases as the piston moves from the inlet end of the chamber and towards the outlet end so that the axial position of the piston is proportional to the flow rate through the flow meter. An indicator having a rotatable shaft is connected to the piston by an actuating lever to visually indicate the axial position of the piston exteriorly of the flow meter housing.

In the preferred form of the invention, the fluid flow meter further comprises a manually operated fluid bypass valve to directly bypass the fluid inlet to the fluid outlet. The bypass valve, when actuated, should result in a decrease of the indicated flow rate through the flow meter and thus enables a simple and quick test that the fluid flow meter is still functional.

BRIEF DESCRIPTION OF THE DRAWING

A better understanding of the present invention will be had upon reference to the following detailed description when read in conjunction with the accompanying drawing wherein like reference characters refer to like parts throughout the several views, and in which:

FIG. 1 is a cross sectional view illustrating a preferred embodiment of the flow meter according to the present invention;

FIG. 2 is a sectional view taken substantially along line 2—2 in FIG. 1;

FIG. 3 is a fragmentary sectional view illustrating a portion of the preferred embodiment of the invention;

DETAILED DESCRIPTION OF PREFERRED EMBODIMENTS OF THE PRESENT INVENTION

Figure 4:
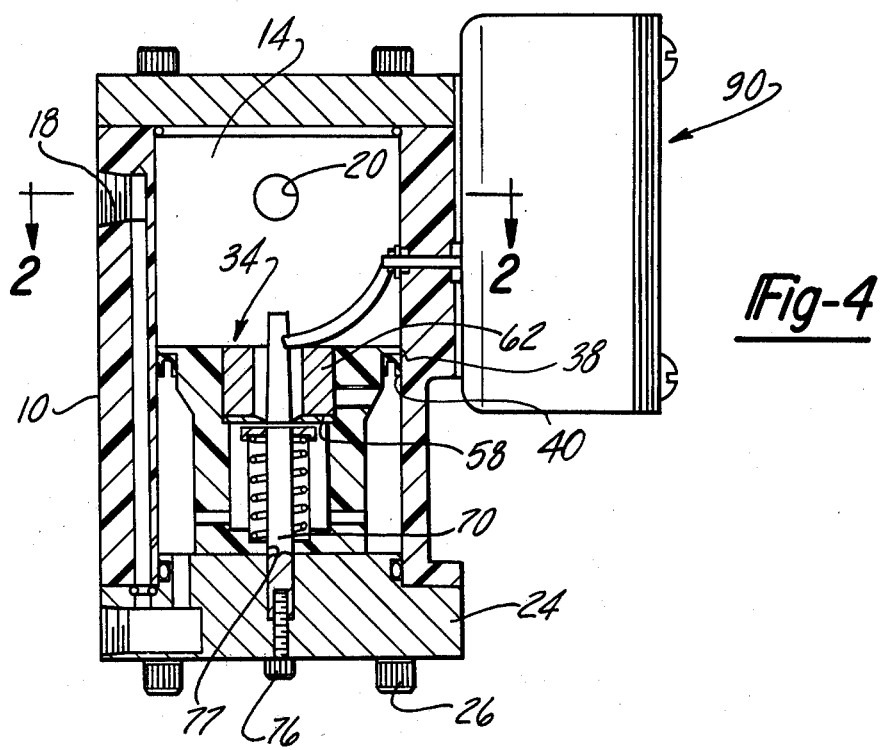
FIG. 4 is a longitudinal sectional view illustrating a second preferred embodiment of the flow meter according to the present invention.

With reference first to FIGS. 1 and 2, a preferred embodiment of the flow meter according to the present invention is thereshown and comprises a tubular and cylindrical housing 10 closed at one axial end by a cover plate 12. The housing 10 with the cover plate 12 defines a cylindrical housing chamber 14 open at one end 16 of the housing 10.

A fluid inlet port 18 and outlet port 20 are formed in the housing 10 so that the ports 18 and 20 extend in a radial direction with respect to the axis of the housing 10. In addition, both the inlet port 18 and outlet port 20 are aligned with each other and internally threaded for connection with conventional fluid fittings (not shown).

The outlet port 20 is open directly to the housing chamber 14 adjacent its upper end. Conversely, the inlet port 18 intersects and is fluidly connected with a passageway 22 extending axially through the housing 10 and which is open to the housing end 16. A cylindrical cap 24 is detachably secured to the housing end 16 by bolts 26 so that the cap 24 covers and closes the open end 16 of the housing 10 and thus closes the chamber 14. A fluid passageway 28 is formed through the cap 24 so that one end 30 of the passageway 28 registers with the passageway 22 while the other end 32 of the passageway 28 is open to the lower end of the housing chamber 14. Thus, the passageways 22 and 28 together with the housing chamber 14 form a fluid passage means for fluidly connecting the housing inlet 18 to the outlet 20.

The flow meter further comprises a cylindrical piston 34 having an enlarged diameter portion 36 its upper end 38. An annular seal 40 is mounted within a circumferential groove 42 in the enlarged diameter piston portion 36 and this seal 40 engages and fluidly seals the piston 34 to the walls 44 of the housing chamber 14. The fluid seal 40 thus divides the housing chamber 14 into an upper cylindrical subchamber 46 and a lower annular subchamber 48. The upper subchamber 46 is open directly to the housing fluid outlet 20 while the annular subchamber 48 is open to the housing inlet 18 via the passageways 22, 28, 30 and 32.

An axial bore 50 having an enlarged diameter portion 52 and a reduced diameter portion 54 is formed axially through the piston 34. The enlarged and reduced diameter portion 52 and 54, respectively, form an annular abutment surface 56 at their intersection at approximately the midpoint of the piston bore 50. A plate 58 having a central orifice 60 is positioned within the enlarged diameter portion 52 of the piston bore 50 so that one side of the orifice plate 58 abuts against the abutment surface 56. An annular retainer 62 is then inserted into the enlarged diameter portion 52 of the piston bore 50 so that the retainer 62 abuts against the orifice plate 58 and the retainer 62 is secured to the piston 34 by a set screw 64. Both the retainer 62 and the orifice plate 58 can be detached from the piston 34 by loosening the set screw 64.

With the orifice plate 58 secured to the piston 34 in the above described fashion, the upper side of the orifice plate 58 is open to the housing outlet 20 through the retainer bore and the upper subchamber 46. Conversely, the lower side of the orifice plate 58 is open to the lower subchamber 48 through the reduced diameter portion 54 of the piston bore 50 and one or more radial bores 66 formed through the piston 34 between the piston bore 50 and lower subchamber 48.

An elongated metering rod 70 having a tapered or conical portion 72 is attached to the cap 24 by a single screw 76 so that the rod tapered portion 72 extends through the orifice plate 58 and also so that the rod 70 extends through a small bore 77 in the lower end 82 of the piston 34. A spring retainer 78 is secured to the metering rod 70 between the cap 24 and the orifice plate 58 and a compression spring 80 is entrapped between the spring retainer 78 and the end 82 of the piston 34 so that the spring 80 urges the piston 34 towards the cap 24. The piston 34, however, can axially slide within the housing chamber 14 against the force of the spring 80 and, in doing so, the area of the opening between the orifice 60 in the orifice plate 58 and the metering rod tapered portion 72 progressively increases. Consequently, the axial position of the piston 34 is proportional to the open area of the orifice and thus proportional to the fluid flow rate through the flow meter. Furthermore, as the piston 34 axially slides in the housing 10, the seal 40 guides the upper end of the piston 34 while the piston bore 77 guides the lower end of the piston so that the piston remains centered in the housing chamber 14.

As is best shown in FIG. 2, the screw 76 extends through a bore 150 having an enlarged diameter portion 152 formed at the center of the cap 24 and forming an annular abutment surface 153 therebetween. The screw 76 engages an axially extending threaded bore 154 at the lower end of the rod 70. As the screw 76 is tightened into the rod bore 154, the screw 76 pulls the lower end of the rod 70 against the abutment surface 153 and forms a metal-to-metal seal between the rod 70 and the cap 24 thus eliminating the need for any additional seals between the rod 70 and cap 24. The screw 76 also enables the rod 70 and piston 34 to be rapidly and easily removed from the cap 24 for replacement as required.

The small bore 77 in the lower end of the piston 34 ensures that, in conjunction with the upper piston seal, the piston is automatically centered within the housing chamber 14 and cannot cock to one side since the bore 77 is only slightly greater in size than the rod 70. The small piston bore 77 also causes only negligible drag between the piston 34 and rod 70 thus improving the reliability and accuracy of the flow meter. The small piston bore 77 is also inexpensive to machine and eliminates or greatly reduces unwanted hystersis of the flow meter.

From the foregoing, it should be apparent that the piston 34 together with the rod 70, attached cap 24 and associated components form a cartridge unit which is easily inserted into and removed from the housing 10 as required. Furthermore, the entire cartridge unit can be replaced without disturbing any piping of the fluid system.

The lower portion of the rod 70 has a cross-sectional area greater than the orifice 60. Thus, even if the rod 70 is removed from the cap 24 the rod 70 and piston 34 remain attached together.

An indicator assembly 90 is attached to the flow meter housing 10 to provide an exteriorly visible indication of the axial position of the piston 34 and thus of the flow rate through the flow meter. The indicator 90 is conventional in construction and includes a rotatable indicator shaft 92 having an indicator needle 94 secured to and extending radially outwardly from one end of the shaft 92. Thus, as the shaft 92 rotates, the needle 94 swings across an indicia scale 96 which is exteriorly visible.

The indicator shaft 92 extends through a bore 98 in the flow meter housing 10 so that one end 99 of the shaft 92 is positioned within the housing chamber 14. Conventional fluid seals 100 around the indicator shaft 92 prevent fluid leakage along the shaft 92.

An actuating lever 102 is secured to the shaft end 99 and also abuts against the upper end of the piston 34. Thus, as the piston 34 moves axially upwardly in the chamber 14, the piston 34 rotates the indicator shaft 92 by the actuating lever 102.

Although the operation of the flow meter according to the present invention should be apparent, it will be briefly summarized for the sake of clarity. In operation, the flow meter inlet 18 and outlet 20 are connected to a fluid system so that fluid flow into the inlet passes through the passageways 22, 28, 30 and 32 and to the lower end of the housing chamber 14. Fluid flow into the inlet 18 urges the piston 34 upwardly against the force of the compression spring 80 so that the fluid flows into the annular subchamber 48, through the radial piston bores 66 and into the reduced diameter portion 54 of the piston bore 50.

The fluid then passes through the open area between the orifice 60 in the plate 58 and the tapered portion 72 of the metering rod 70. The fluid then flows through the upper subchamber 46 and out through the outlet 20.

The flow rate through the flow meter is limited by and, therefore, proportional to the effective opening between the orifice 60 in the orifice plate 58 and the tapered portion 72 of the metering rod 70. Thus, as the flow rate increases through the flow meter, the increased flow rate will urge the piston 34 upwardly in the housing chamber 14 and increase the effective area of the orifice opening and vice versa. Conversely, the axial position of the piston 34 is proportional to the flow rate through the flow meter and the position of the piston 34 is visually displayed by the indicator assembly 90 in the previously described fashion.

The flow range of the flow meter according to the present invention can be easily varied in the field. More specifically, the flow range for the flow meter can be changed by simply replacing the orifice plate 58 with a new orifice plate 58 having a different size orifice 60. The replacement of the orifice plate 58 can be easily accomplished by merely removing the annular retainer 62 after loosening the set screw 64, removing the old orifice plate 58, inserting a new orifice plate and thereafter reinserting and reattaching the retainer 62 to the piston 34. Thus, the orifice plate 58 is the only component which must be replaced in order to change the flow range for the flow meter.

With reference now to FIG. 3, the present invention further comprises a bypass valve means 110 for temporarily bypassing the fluid inlet 18 to the outlet 20. Such a bypass valve means 110, when opened, should dramatically reduce the flow reading on the indicator assembly 90 and thus provide an indication that the flow meter is fully operational. Conversely, if the piston 34 is stuck within the housing chamber 14 the flow reading will not change as the bypass valve means 110 is opened.

The bypass valve means 110 includes a bore 112 formed radially through the housing 10 and which intersects the passageway 22. In addition, a portion 114 of the bore 112 between the passageway 22 and the housing chamber 14 is enlarged in diameter and has a conical valve seat 116 formed on the housing wall 44.

A bypass valve member 118 having an enlarged valve head 120 which seats with the valve 116 is positioned through the bore 112 so that one end 122 of the valve member 118 is accessible exteriorly of the housing 10 while a fluid seal 124 prevents fluid leakage along the valve member 118. A knob 126 is threadably secured to the end 122 of the valve member 118 while a compression spring 128 is positioned between the knob 126 and the housing 10. The spring 128 thus urges the valve member 118 against the valve seat 116 thus preventing fluid flow through the enlarged portion 114 of the bore 112. When it is desired to bypass the fluid inlet 18 directly to the outlet 20, however, the knob 126 can be manually depressed thus opening the bypass valve member 118 and permitting fluid flow from the passageway 22, through the enlarged diameter portion 114 of the bore 112 and directly to the outlet 20. In the event that the flow rate reading does not decrease once the bypass valve means 110 is opened, this is indicative that the piston 34 is either stuck within the housing chamber 14 or that the flow meter is otherwise inoperative.

From the foregoing, it can be seen that the flow meter according to the present invention provides a fluid flow meter which is simple and yet durable in construction. Furthermore, the flow range of the flow meter can be easily changed in the field by simply replacing the orifice plate 58 with a new or different orifice plate 58. A still further advantage of the flow meter according to the present invention is that it can be easily tested to determine its operability by merely temporarily opening the bypass valve means 110. The flow meter according to the present invention, furthermore, has proven satisfactory in measuring both liquid and gas flow rates.

Figure 5:
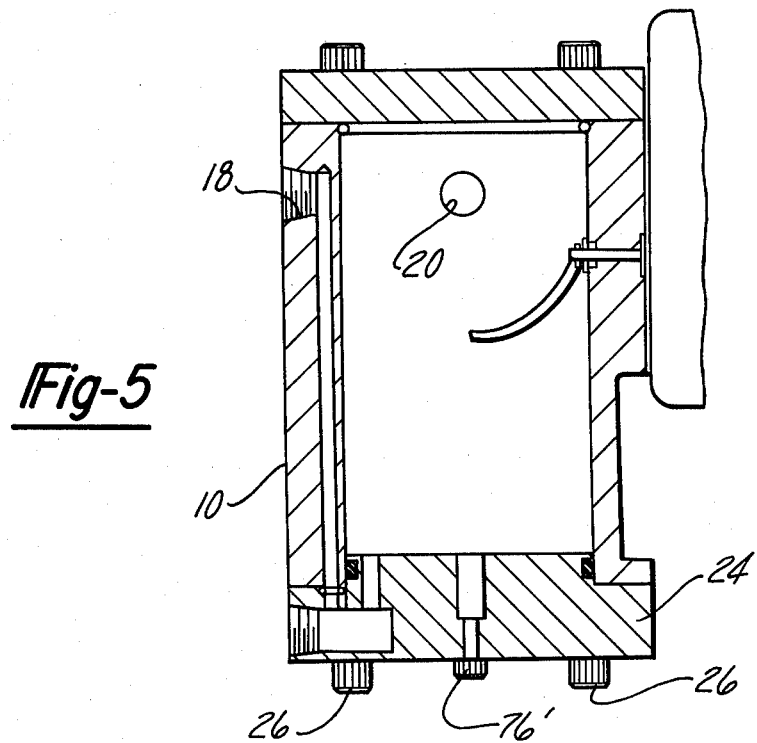
FIG. 5 is a longitudinal sectional view similar to FIG. 4 but with portions of the flow meter removed.

With reference to FIGS. 4 and 5, a second preferred embodiment of the invention is thereshown. Like reference characters will refer to like parts with respect to the first described embodiment of the invention and, for brevity, such parts will not be again described.

As best shown in FIG. 4, unlike the previously described flow meter, the orifice plate 58 and retainer 62 are fixedly, i.e., nondetachably secured to the piston 34. Thus, in order to change the flow range for the flow meter, the entire piston 34 with its associated components must be replaced. This, however, can be easily accomplished since the piston 34 can be easily removed from the cap 24 by unscrewing the screw 76 from the end of the meter rod 70.

With reference now particularly to FIG. 5, in the event that the flow meter malfunctions, and the repair parts, e.g., a new piston 34 are not available, the entire piston 34 can be removed from the cap 24 and the cap 24 reattached to the housing 10 by the bolts 26. A plug or screw 76' is used to close the central opening in the cap 24. Upon doing this, the flow from the housing inlet 18 and to the outlet 20 can continue without interruption even though the flow meter itself, of course, is inoperable. Thus, a defective piston 34 can be removed from the flow meter for an extended period of time for maintenance and/or replacement without shutting down the fluid system.

An important feature of the present invention is the provision of the small guide bore 77 at the lower end 82 of the piston 34 which automatically centers and guides the lower end 82 of the piston 34 to the rod 70 and thus guides the piston 34 centrally through the housing chamber 14 with virtually no drag or resistance. The piston seal 40 simultaneously guides the upper end 38 of the piston 34 through the housing chamber 14.

A still further important feature of the present invention is that the piston assembly together with the cap 24 form a cartridge unit which can be easily attached to and detached from the housing without disturbing any piping for the fluid system.

Having described my invention, however, many modifications thereto will become apparent to those skilled in the art to which it pertains without deviation from the spirit of the invention as defined by the scope of the appended claims.

I claim:

1. A fluid flow meter comprising:
   a housing having a fluid inlet and a fluid outlet,
   fluid passage means formed through said housing for connecting said inlet with said outlet, said fluid passage means including an elongated housing chamber and means connecting one end of the chamber to the inlet and the other end of the chamber to the outlet,
   a cartridge assembly self-aligning piston having an axial bore, axially slidably mounted in said chamber and movable between a first position and a second position, and insertable in said housing without disturbing piping,
   means for resiliently urging said piston towards said first position,
   means for fluidly sealing one end of said piston to said housing,
   a plate having an orifice and means for securing said plate to said piston so that said orifice is open to said piston bore and so that one side of said plate is open to the inlet end of the chamber and the other side of the plate is open to the outlet end of the chamber,
   a rod attached to said piston assembly and extending through said housing chamber, said rod having a tapered portion positioned through said plate orifice so that the area of the opening between the rod tapered portion and orifice increases as said piston moves from said first position and towards said second position,
   means for indicating the axial position of said piston exteriorly of said housing; and
   wherein said rod extends through a first bore in the other end of the piston, said first bore having a cross sectional area and shape substantially the same or slightly greater than the rod so that the rod guides said other end of the piston as said piston moves between said first and second position.

2. The invention as defined in claim 1 wherein said housing chamber is open at one end, said flow meter further comprising a cap and means for detachably securing said cap to said housing so that said cap covers the open end of the chamber.

3. The invention as defined in claim 2 wherein said rod is attached to said cap, said rod, piston and cap together forming a cartridge assembly.

4. The invention as defined in claim 2 wherein said housing is generally cylindrical in shape, said inlet and outlet being formed radially through said housing and wherein said fluid passage means comprise a first passageway extending from the inlet and axially through the housing, said first passageway registering with one end of a second passageway formed through the cap, and the other end of the second passageway being open to said housing chamber.

5. The invention as defined in claim 3 wherein said rod is detachably secured to the cap by a removable threaded member.

6. The invention as defined in claim 1 wherein said plate is detachably secured to said piston, said piston bore comprising an enlarged diameter portion and a reduced diameter portion which form an annular abutment surface therebetween, one side of said orifice plate abutting against said abutment surface and wherein said securing means comprises an annular retainer positioned in the enlarged diameter portion of said piston so that one end of the retainer abuts against the other side of the orifice plate, and fastening means for securing said retainer to said piston.

7. The invention as defined in claim 1 and further comprising means for selectively bypassing said inlet directly to said outlet.

8. The invention as defined in claim 7 wherein said fluid passage means comprises a passageway formed axially through said housing between the outer periphery of the housing and the housing chamber, and wherein said bypassing means further comprises a bypass valve bore extending transversely through said passageway and open to said chamber, a bypass valve positioned through said bypass valve bore and having one end positioned exteriorly of said housing, said bypass valve being movable between an open position and a closed position so that in its open position said bypass valve bore establishes fluid communication between said passageway and said housing chamber.

9. The invention as defined in claim 8 and further comprising means for resiliently urging said bypass valve towards its closed position.

10. The invention as defined in claim 2 wherein said cap and said rod are constructed of metal, wherein said cap includes a central throughbore and comprising means for attaching one end of said rod coaxially to said throughbore and for forming a metal-to-metal seal between said rod and said cap.

11. The invention as defined in claim 2 wherein said cap throughbore includes an enlarged diameter portion and a reduced diameter portion which form an annular abutment surface therebetween which faces the housing chamber, said attaching means comprising a threaded member extending through said cap throughbore and which, upon tightening, urges said one end of said rod against said abutment surface to thereby form said metal-to-metal seal.

12. The invention as defined in claim 3 wherein said rod together with said cap and said piston form a cartridge unit which is attachable to and detachable from said housing without disconnection of fluid connections at either said inlet or said outlet.

13. The invention as defined in claim 1 wherein at least a portion of said rod has a cross sectional area greater than the cross sectional area of said orifice.

14. The invention as defined in claim 1 wherein said orifice plate is fixedly secured to said piston.

15. The invention as defined in claim 1 wherein said orifice plate is secured to said piston at a midpoint of said piston.

* * * * *